F. WIDMER.
RAISING AND TRANSPORTING DEVICE.
APPLICATION FILED MAR. 17, 1920.
1,371,961. Patented Mar. 15, 1921.
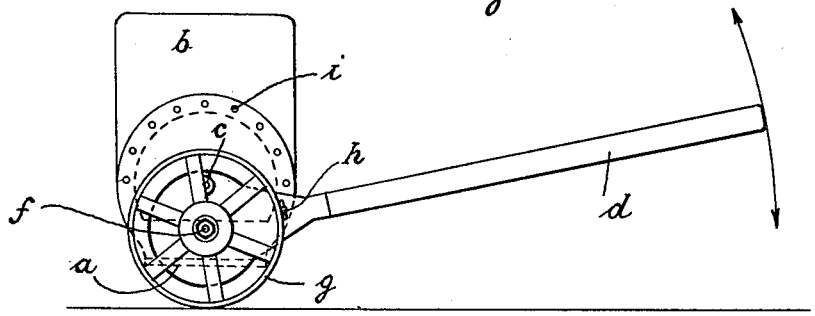
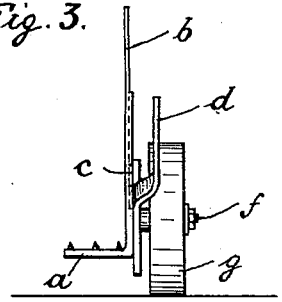
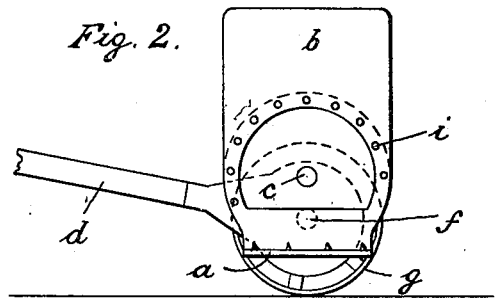
Witnesses:
E. Alder
M. Fraie
Inventor:
Friedrich Widmer
by C. Jewes
His Attorney.

UNITED STATES PATENT OFFICE.

FRIEDRICH WIDMER, OF RORSCHACH, SWITZERLAND.

RAISING AND TRANSPORTING DEVICE.

1,371,961. Specification of Letters Patent. Patented Mar. 15, 1921.

Application filed March 17, 1920. Serial No. 366,670.

*To all whom it may concern:*

Be it known that I, FRIEDRICH WIDMER, a citizen of the Republic of Switzerland, residing at Rorschach, in the Canton of Thurgau, Switzerland, have invented certain new and useful Improvements in Raising and Transporting Devices, of which the following is a specification.

This invention relates to raising and transporting devices for packing cases and the like, wherein two or more separate and single wheeled carriages are employed, a corresponding number of carriages being so mounted at either side of the object to be raised and transported, that the whole when in operation forms a complete vehicle. Each of the said carriages comprises a load-supporting member mounted on wheels or rollers and adapted to be inserted beneath the load, and means for adjusting and securing the load-supporting member in different positions in relation to the height of the load from the carriage-way.

The device according to this invention may be used for conveying objects of various dimensions. For instance, very high loads or objects are required to be raised only a short distance from the floor in order that, when tilted even slightly, their lower edges rest on the floor and thus prevent the falling over of the load. Very long objects, however, must be raised as high as possible so as to avoid coming in contact with the sometimes uneven carriage-way and thereby form an obstruction in the path.

In order that the invention may be clearly understood reference is made to the accompanying drawings, in which:—

Figure 1 shows an elevation of the raising device according to a first construction and as seen from one side, Fig. 2 shows an elevation as seen from the other side, and Fig. 3 shows an end elevation of Fig. 2.

Referring to the drawings $g$ designates a single carriage wheel of which one or two or more may be mounted at each side of a packing case or other load, and $f$ designates the wheel axle. The latter carries at one side a lever $d$ and adjacent thereto and vertically slidable is a load-supporting member $b$ having an integral extension $a$ which is formed at right angles to the part $b$ and provided with teeth for gripping purposes. This load-supporting member is provided with a semi-circular flange having a series of holes $i$ with which a catch bolt $h$ secured in a suitable position on the member or lever $d$ is adapted to engage so that the latter, when swung about the semi-circular flange, may be fixed in any desired position. The outer part of the lever is bent or set off from the inner portion so as to allow for clearance and in order to prevent obstruction of the lever with the supporting member, I mount a pin $c$ within the recess formed by the flange on said member the pin serving as a distance piece.

Having now fully described my said invention what I claim and desire to secure by Letters Patent is:—

In a raising and transporting device, the combination, with a wheel carriage mounted at either side of the object to be raised and transported, of a load-supporting member carried by the wheel carriage and having a semi-circular flange at its inner side with a series of holes therein, said load-supporting member being formed at the bottom with an outwardly projecting extension which is at right angles to the other integral part and provided with teeth at its upper face, and means for vertically adjusting the load-supporting member, the said means comprising a lever mounted on the axle of the wheel carriage, between the wheel and the load-supporting member, and adapted to swing about the aforesaid semi-circular flange, and a catch bolt secured to the said lever and adapted to be brought into engagement with any one of the holes in the semi-circular flange, all substantially as and for the purpose set forth.

In testimony whereof I have hereunto set my hand in the presence of two subscribing witnesses.

FRIEDRICH WIDMER.

Witnesses:
FRANK DIUNNKE,
WALTER NECILE.